United States Patent
Yamanaka et al.

(10) Patent No.: US 7,209,427 B2
(45) Date of Patent: Apr. 24, 2007

(54) OPTICAL PICKUP WITH REDUCED SIZE

(75) Inventors: Kazuhiko Yamanaka, Takatsuki (JP); Takuya Okuda, Kyoto (JP); Shinichi Ijima, Takatsuki (JP); Tomoaki Tojo, Osaka (JP); Kazutoshi Onozawa, Takatsuki (JP); Junichi Kubo, Daito (JP)

(73) Assignees: Matsushita Electric Industrial Co., Ltd., Osaka (JP); Nalux Co., Ltd., Osaka (JP)

( * ) Notice: Subject to any disclaimer, the term of this patent is extended or adjusted under 35 U.S.C. 154(b) by 510 days.

(21) Appl. No.: 10/870,438

(22) Filed: Jun. 18, 2004

(65) Prior Publication Data

US 2005/0047312 A1    Mar. 3, 2005

(30) Foreign Application Priority Data

Jun. 19, 2003    (JP)    .............................. 2003-174312

(51) Int. Cl.
*G11B 7/00*    (2006.01)

(52) U.S. Cl. .............................. 369/112.08; 369/112.25; 369/112.29

(58) Field of Classification Search ........... 369/112.03, 369/112.04, 112.07, 112.08, 112.12, 112.13, 369/112.23, 112.24, 112.25, 112.26

See application file for complete search history.

(56) References Cited

U.S. PATENT DOCUMENTS

| | | | | |
|---|---|---|---|---|
| 5,111,449 A | * | 5/1992 | Kurata et al. ............. | 369/44.37 |
| 5,465,247 A | * | 11/1995 | Kobayashi ............. | 369/112.28 |
| 5,615,203 A | * | 3/1997 | Fukakusa .................... | 720/682 |
| 5,621,716 A | * | 4/1997 | Kojima et al. ......... | 369/112.07 |
| 5,629,919 A | * | 5/1997 | Hayashi et al. ........ | 369/112.17 |
| 5,729,519 A | * | 3/1998 | Nakanishi et al. ..... | 369/112.04 |
| 5,805,556 A | * | 9/1998 | Lee et al. .............. | 369/112.07 |
| 5,986,995 A | * | 11/1999 | He et al. ................ | 369/112.07 |
| 6,700,856 B2 | * | 3/2004 | Ueyanagi ............... | 369/112.23 |

FOREIGN PATENT DOCUMENTS

| | | |
|---|---|---|
| JP | 5-109106 | 4/1993 |
| JP | 06-290502 | 10/1994 |
| JP | 08-212584 | 8/1996 |
| JP | 10-177733 | 6/1998 |

* cited by examiner

*Primary Examiner*—Paul W. Huber
(74) *Attorney, Agent, or Firm*—McDermott Will & Emery LLP

(57) ABSTRACT

An optical pickup having a light-emitting element, an objective lens unit, a reflecting mirror and a light-receiving element, emits a beam onto an optical recording medium and uses a reflected beam to read recorded information. In the objective lens unit, a central part of a surface, facing the light-emitting element, of an objective lens disposed so that an optical axis is substantially aligned with a chief ray of the beam emitted by the light-emitting element, is a transmissive diffraction grating, and a central part of a surface of the objective lens that will face the optical recording medium is a convex mirror which bulges toward the light-emitting element. The reflecting mirror, which is annular and encompasses the optical axis of the objective lens, reflects toward the objective lens the beam from the light-emitting element that has passed through the transmissive diffraction grating and been reflected by the convex mirror. The light-receiving element receives first-order diffracted light, of the reflected beam from the recording medium, diffracted by the transmissive diffraction grating.

8 Claims, 19 Drawing Sheets

FIG.5

| SIGN | MEASUREMENT(mm) |
|---|---|
| T1 | 0.52 |
| T2 | 0.3 |
| T3 | 2.0 |
| T4 | 3.45 |
| T5 | 3.55 |
| T6 | 2.25 |
| T7 | 0.6 |

FIG.6

| SIGN | NAME | REFRACTIVE INDEX |
|---|---|---|
| 81 | OPTICAL DISK | 1.5852 |
| 1 | OBJECTIVE LENS UNIT | 1.540448 |
| 6 | SUPPORTING BOARD | 1.514207 |

FIG.7

$$Z = \frac{\frac{h^2}{r}}{1+\sqrt{1-(1+K)\frac{h^2}{r^2}}} + \sum_{i=2} A_{2i} h^{2i}$$

FIG.8

| SIGN | NAME | r(mm) | K | A4 | A6 | A8 |
|---|---|---|---|---|---|---|
| 8 | PLANE MIRROR | ∞ | - | - | - | - |
| 2 | PLANE SURFACE | ∞ | - | - | - | - |
| 3 | CONVEX MIRROR | 4.414 | -4.724 | - | - | - |
| 4 | CURVED SURFACE | 2.621 | -0.8532 | 0.0003083 | -0.0001563 | 1.117E-5 |
| 5 | CURVED SURFACE | -3.071 | -6.058 | 0.001494 | -3.375E-5 | 2.312E-6 |

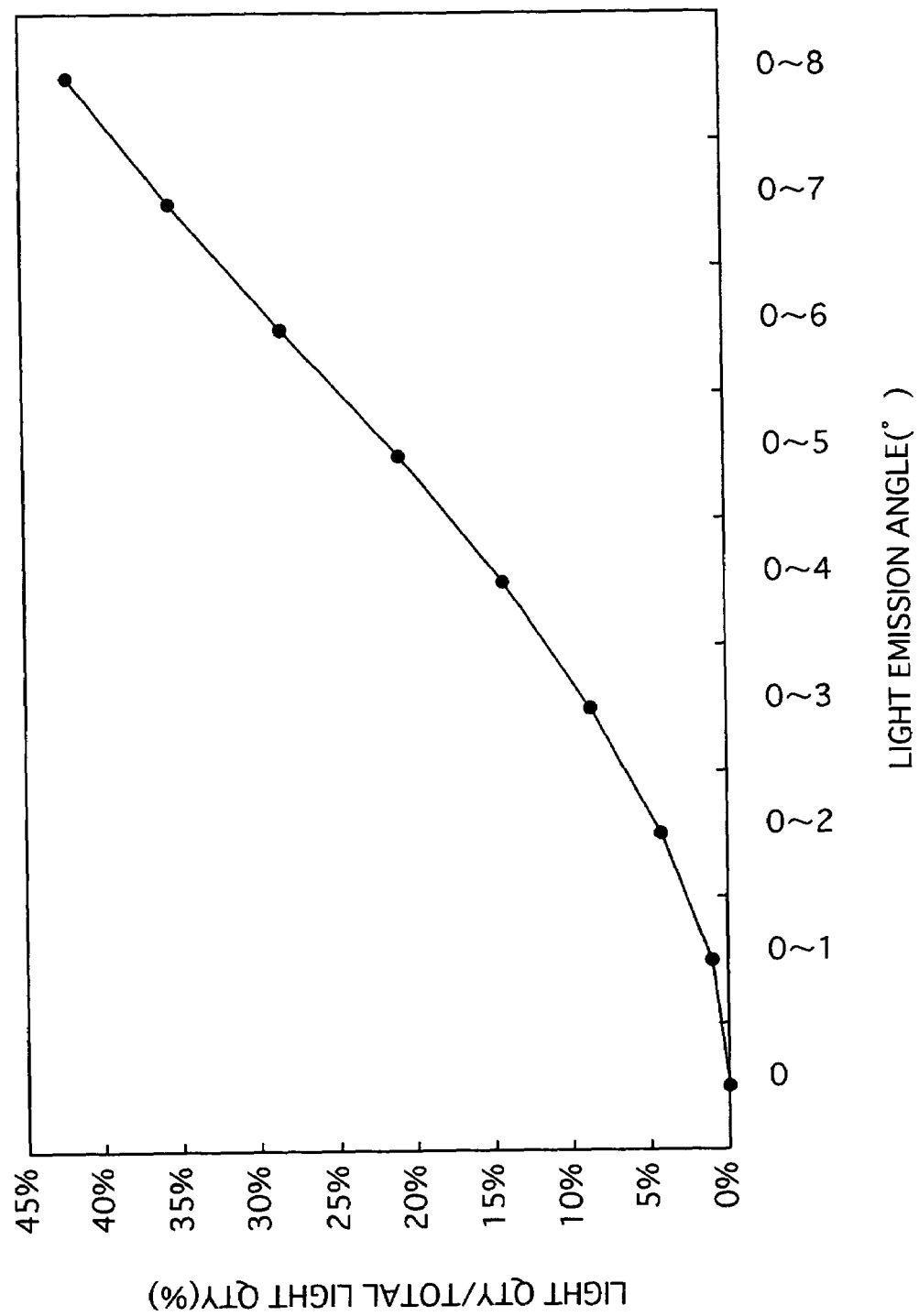

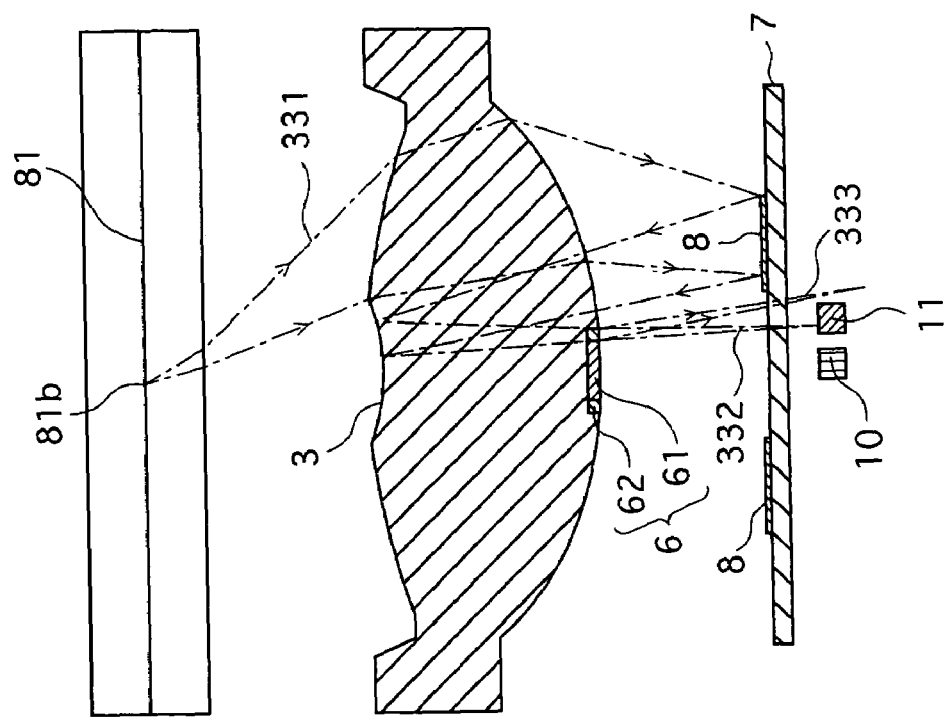
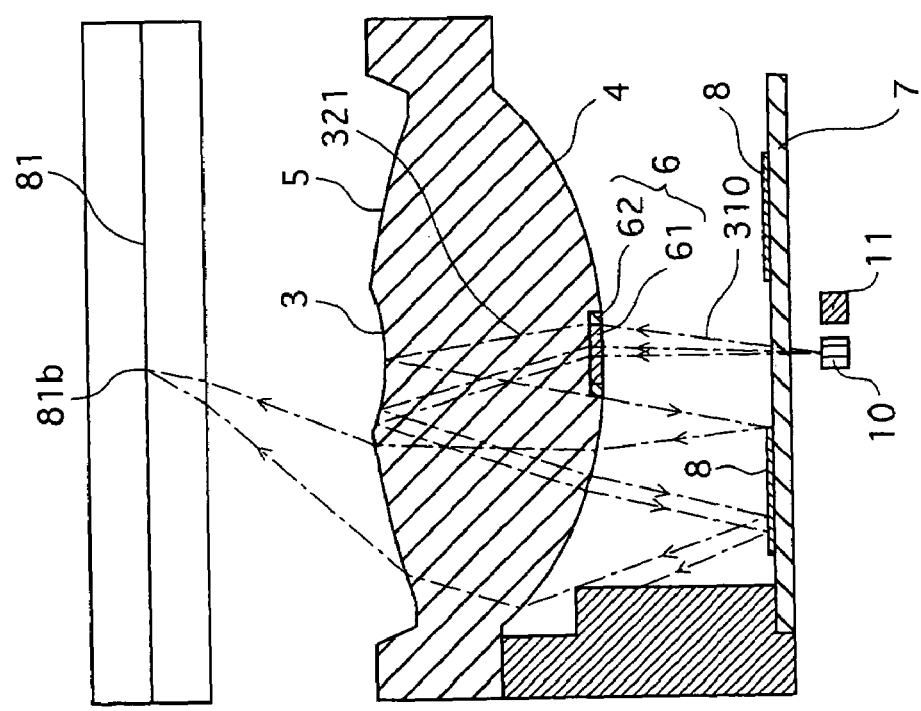

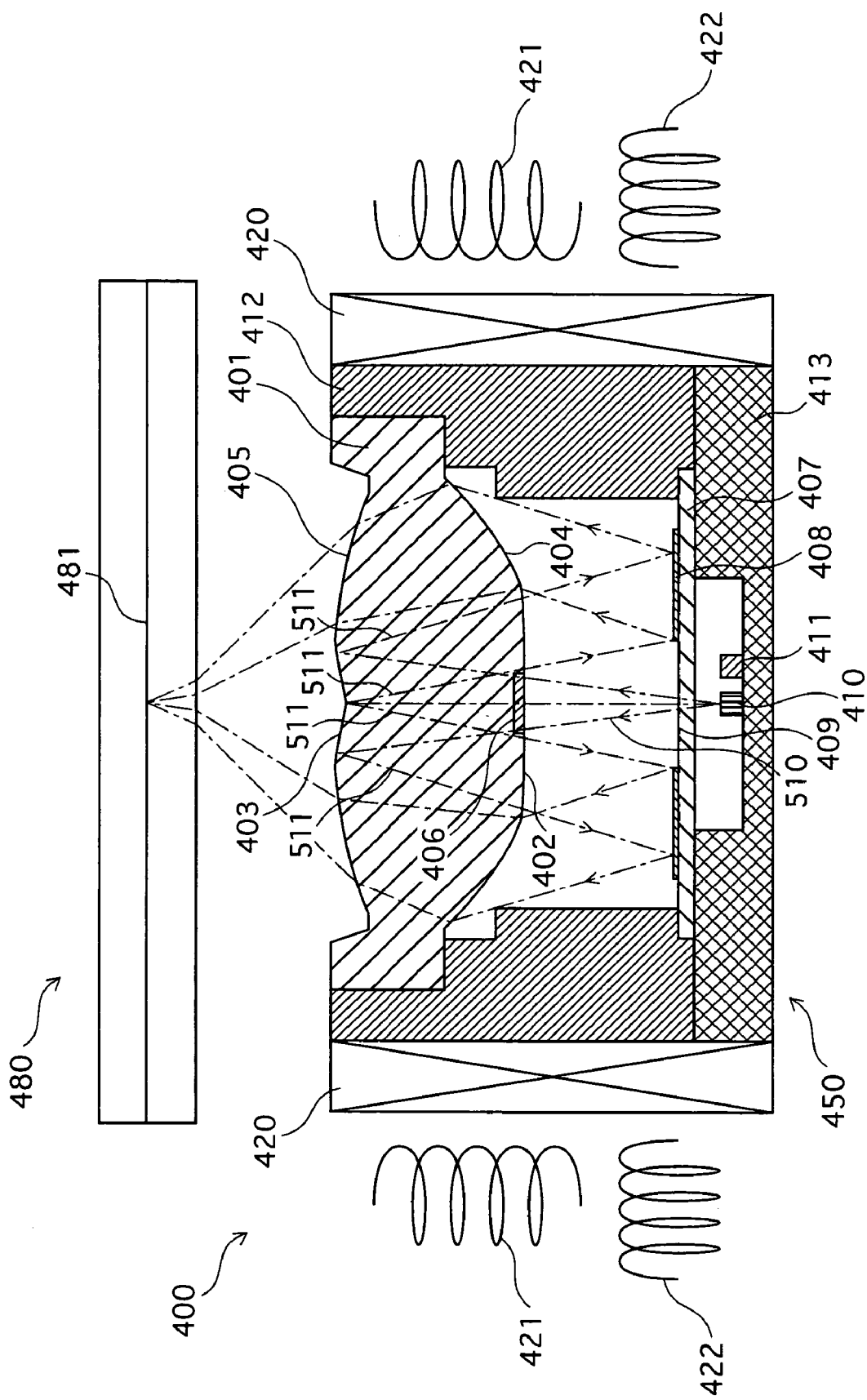

FIG.16

| SIGN | MEASUREMENT(mm) |
|---|---|
| T11 | 0.2 |
| T12 | 0.3 |
| T13 | 1.1 |
| T14 | 1.25 |
| T15 | 2.0 |
| T16 | 2.05 |
| T17 | 1.1 |
| T18 | 0.6 |

FIG.17

$$Z = \frac{\frac{h^2}{r}}{1 + \sqrt{1-(1+K)\frac{h^2}{r^2}}} + \sum_{i=1} A_i h^i$$

FIG.18

| SIGN | NAME | r(mm) | K | A1 | A3 | A4 | A5 | A6 | A7 | A8 | A10 | A12 |
|---|---|---|---|---|---|---|---|---|---|---|---|---|
| 408 | PLANE MIRROR | ∞ | - | - | - | - | - | - | - | - | - | - |
| 402 | PLANE SURFACE | ∞ | - | - | - | - | - | - | - | - | - | - |
| 403 | CONVEX MIRROR | ∞ | 0 | 0.05 | - | - | - | - | - | - | - | - |
| 404 | CURVED SURFACE | 1.195 | -2.3 | 0 | 0 | 0.03579 | 0 | -0.002797 | 0 | 0 | 0 | 0 |
| 405 | CURVED SURFACE | -1.126 | -8.483 | 0.03168 | -0.6256 | 1.518 | -1.654 | 0.8870 | -0.1889 | $-3.134e^{-5}$ | $-8.343e^{-6}$ | $-3.306e^{-6}$ |

OPTICAL PICKUP WITH REDUCED SIZE

This application is based on application No. 2003-174312 filed in Japan, the content of which is hereby incorporated by reference.

BACKGROUND OF THE INVENTION

1. Field of the Invention

The present invention relates to optical pickups for recording information to optical disk and reproducing recorded information, and in particular to technology for reducing the size of optical pickups.

2. Related Art

In recent years, optical disk devices applied in wide ranging fields have been used to record information to optical disk such as CD (compact disk) and DVD (digital versatile disk), and to reproduce recorded information.

An optical pickup includes a semiconductor laser diode, an objective lens, and a photodiode. By controlling the orientation of the objective lens to follow the displacement of the optical disk, the optical pickup focuses the laser beam emitted from the semiconductor laser diode at a predetermined position on the recording surface of the optical disk and directs reflected light toward the photodiode (e.g. see Japanese Published Patent Application NO. 10-177733).

By adopting this structure in which the semiconductor laser diode and photodiode are fixed with only the objective lens following the displacement of the optical disk, the number of optical components is increased due to the provision of optical elements in the moving part that follows the optical disk and the fixed part that does not follow the optical disk. This is counter to demands for optical pickup miniaturization. Also, coma aberration is caused by the optical axis of the objective lens not being aligned with the chief ray of the beam due to the displacement of the objective lens.

In regard to this problem, Japanese Published Patent Application NO. 5-109106 discloses a structure in which all of the optical elements are mounted within a single housing, which is made to follow the optical disk as one (hereinafter, this structure is referred to as an "integral optical system"). Miniaturization is possible with an integral optical system type optical pickup due to the reduced number of parts.

FIG. 1 is a cross-sectional view showing a typical structure of this type of optical pickup. As shown in FIG. 1, optical pickup 1000 includes a semiconductor laser diode 1001, reflecting surfaces 1002 and 1003, an objective lens 1004, a photodetector 1006, and a drive coil 1020. Reflecting surface 1002 is formed as a reflective diffraction grating that reflects the beam from semiconductor laser diode 1001. Reflecting surface 1003 is formed as a total internal reflection surface that reflects the beam from reflecting surface 1002. Objective lens 1004 focuses the reflected beam from reflecting surface 1003 on a recording surface 1005. Photodetector 1006 detects the intensity distribution of the beam reflected by recording surface 1005.

With this structure, the beam emitted from semiconductor laser diode 1001 spreads out as it is reflected by reflecting surfaces 1002 and 1003, before being focused on recording surface 1005 by objective lens 1004.

The beam reflected by recording surface 1005 again passes through objective lens 1004 and is reflected by reflecting surfaces 1003 and 1002 while being focused at the same time. First-order diffracted light of the reflected beam diffracted by the reflective diffraction grating of reflecting surface 1002 enters photodetector 1006.

The intensity distribution of the reflected beam from recording surface 1005 differs depending on whether a pit is formed at a focusing position 81a. Photodetector 1006 outputs a focus error signal and a tracking error signal according to the intensity distribution. When these error signals are energized by drive coil 1020, the orientation of optical pickup 1000 is controlled using electromagnetic force to focus the beam at focusing position 81a. Information recorded on recording surface 1005 is read using the output signal of photodetector 1006.

To read pit information on the optical disk precisely with an optical pickup, a part of the emission beam, near the chief ray, having a flat intensity distribution is focused on the optical disk. Consequently, optical properties improve with decreases in the NAO (numerical aperture on object side), directly after emission by the semiconductor laser diode, of the beam that enters the objective lens. Also, NA/NAO (magnifying power) increases with decreases in NAO, given that NA on the optical disk side is stipulated as 0.45 for CD, 0.6 for DVD, and 0.85 for Blu-ray disk.

NAO on the semiconductor laser diode side is the sine of the half-cone angle of the beam that enters the entrance pupil of the objective lens, and is roughly determined by the ratio of the entrance pupil radius of the objective lens to the optical path length from the semiconductor laser diode to the objective lens. Consequently, magnifying power increases with increases in the optical path length from the semiconductor laser diode to the objective lens for a given entrance pupil radius.

Using reflecting surfaces 1002 and 1003 in optical pickup 1000 enables the distance between the semiconductor laser diode and the objective lens to be shortened to one third of that when reflecting surfaces are not employed, with optical path length remaining unchanged. In other words, this structure allows the size of the optical pickup to be reduced in the optical axis direction of the objective lens with magnifying power remaining unchanged.

Furthermore, the fixed positional relationship between objective lens 1004 and the other optical elements in optical pickup 1000 also makes it possible to eliminate coma aberration.

SUMMARY OF THE INVENTION

However, the great demand for reducing the size of optical disk devices has meant that further reductions in the size of optical pickups are strongly sought.

The miniaturization of optical pickups calls for extremely detailed processing in their manufacture. In particular, the high processing precision demanded of the optical elements is a primary factor in manufacturing cost hikes. For this reason, processing precision needs to be mitigated.

Furthermore, those parts of the beam directed toward objective lens 1004 from reflecting surface 1003 in optical pickup 1000 that enter reflecting surface 1002 do not contribute to the reflected beam from recording surface 1005. The intensity distribution of the chief ray part of the beam emitted by semiconductor laser diode 1001 is, however, the strongest. Since the use efficiency of the beam emitted by semiconductor laser diode 1001 is reduced as a result, the output of semiconductor laser diode 1001 needs to be raised, inviting hikes in power consumption and reduced device life.

The present invention, which arose from the above problems, aims to provide a small, low-cost optical pickup having high light-use efficiency.

To solve the above problems, an optical pickup pertaining to the present invention emits a beam onto an optical recording medium and using a reflected beam from the recording medium to read recorded information. The optical pickup includes: a light-emitting element operable to emit the beam; an objective lens unit in which a central part of a surface, facing the light-emitting element, of an objective lens disposed so that an optical axis is substantially aligned with a chief ray of the beam emitted by the light-emitting element, is a transmissive diffraction grating, and a central part of a surface of the objective lens that will face the optical recording medium is a convex mirror which bulges toward the light-emitting element; an annular reflecting mirror that encompasses the optical axis of the objective lens and is operable to reflect toward the objective lens, the beam from the light-emitting element that has passed through the transmissive diffraction grating and been reflected by the convex mirror; and a light-receiving element operable to receive first-order diffracted light, of the reflected beam from the recording medium, diffracted by the transmissive diffraction grating.

That is, with an optical pickup pertaining to the present invention, the beam emitted from the light-emitting element passes through the transmissive diffraction grating and is reflected firstly by the convex mirror and then by the reflecting mirror, before being focused on the optical recording medium by the objective lens. Next, the reflected beam from the recording medium passes through the objective lens and is reflected firstly by the reflecting mirror and then by the convex mirror, before being diffracted by the transmissive diffraction grating and directed toward the light-receiving element.

Thus, in contrast to the prior art in which reflecting mirror 1002 is disposed on the light-emitting element side of objective lens 1004, with the present invention a convex mirror is disposed on the optical recording medium side of the objective lens. Being able to increase the optical path length by the amount that the light emitted from the light-emitting element travels within the objective lens thus makes it possible to reduce the size of the optical pickup by shortening the distance between the light-emitting element and the objective lens. Optical pickup miniaturization can also be achieved, since use of the convex mirror enables the optical path length to be shortened without decreasing magnifying power.

Also, the depth of grooves in the diffraction grating is an important factor affecting the phase difference of diffracted light and determining diffraction efficiency. With a reflective diffraction grating, the phase difference between the reflected beam from the grooves and the reflected beam from other parts of the grating is "$2 \times n1 \times d$", where "$n1$" is the refractive index of space around the diffraction grating, "$n2$" is the refractive index of the diffraction grating, and "$d$" is the depths of the grooves in the diffraction grating. The phase difference with a transmissive diffraction grating, on the other hand, is "$(n2-n1) \times d$".

The phase difference for a reflective diffraction grating and a transmissive diffraction grating is respectively "$2d$" and "$0.5d$", where the space around the diffraction grating is air (refractive index: $n1=1$) and the material of the diffraction grating is glass or plastic having a refractive index of $n2=1.5$. In other words, employing a transmissive diffraction grating enables the phase difference error to be suppressed to one quarter of that for a reflective diffraction grating, given the same groove depth tolerance. The present invention thus allows for processing precision of the groove depth to be greatly mitigated in comparison to when a reflective diffraction grating is used.

Furthermore, the use of a convex mirror enables the percentage of the mirror surface occupying the surface area of the entrance pupil in the objective lens to be reduced in comparison to when a plane mirror is used, thereby allowing for improvements in light-use efficiency.

Here, the light-emitting and light-receiving elements preferably are disposed on opposite sides of the objective lens, with the reflecting mirror positioned therebetween. This facilitates the attachment of the light-emitting and light-receiving elements, thereby allowing for manufacturing cost reductions as well as improvements in the processing precision of the optical pickup.

The convex mirror may be aspheric or conical in shape. This allows for improvements in light-use efficiency by decreasing any loss resulting from the reflected beam entering the central part of the annular reflecting mirror.

A feature of the transmissive diffraction grating is the difference in depth between a central part of the diffraction grating in plan view from the light-emitting element and a circumferential part encompassing the central part. Since first-order diffracted light, of the emission beam from the light-emitting element, diffracted by the transmissive diffraction grating enters' the optical recording medium at a different position from that of zero-order diffracted light, the reflected beam does not give an indication of the recorded information at the entrance position of the zero-order diffracted light. There is a danger of recorded-information reading errors occurring when this reflected beam enters the light-receiving element. According to the present invention, the reflected beam can be directed to elements other than the light-emitting element, thereby allowing recorded-information reading errors to be reduced.

With the objective lens unit, at least one of the surface surrounding the transmissive diffraction grating that faces the light-emitting element and the surface surrounding the convex mirror that will face the recording medium may have positive refractive power.

The objective lens may be characterized in being a Fresnel lens. The use of a Fresnel lens allows for further reductions in the size of the optical pickup by cutting down the thickness of the objective lens.

The reflecting mirror may be characterized in being a plane mirror. The use of a plane mirror facilitates the processing of the reflecting mirror, thereby allowing for further reductions in the manufacturing cost of the optical pickup.

As described above, it is possible, according to an optical pickup pertaining to the present invention, to reduce the size of the optical pickup without decreasing magnifying power. Also, processing precision is mitigated by the use of a transmissive diffraction grating in an optical pickup pertaining to the present invention. It is furthermore possible to increase light-use efficiency.

BRIEF DESCRIPTION OF THE DRAWINGS

These and other objects, advantages, and features of the invention will become apparent from the following description thereof taken in conjunction with the accompanying drawings, which illustrate specific embodiments of the present invention.

In the drawings:

FIG. 5 is a table showing the measurements (T1–T7) of optical pickup 100;

FIG. 6 is a table showing the refractive indexes of optical components constituting optical pickup 100;

FIG. 7 is an expression for deriving the aspheric forms of optical components constituting optical pickup 100;

FIG. 8 is a table showing a radius of curvature r, a conic constant K, and aspheric coefficients $A_{2i}$ for optical components constituting optical pickup 100;

FIG. 12 is a graph showing the total light quantity for each light emission angle of the emission beam from light-emitting element 10;

FIGS. 13A & 13B show the optical path of first-order diffracted light diffracted by transmissive diffraction grating 6;

FIG. 14 is a cross-sectional view showing a structure of an optical pickup pertaining to an embodiment 2 of the present invention;

FIG. 16 is a table showing the measurements (T11–T18) of optical pickup 400;

FIG. 17 is an expression for deriving the aspheric forms of optical components constituting optical pickup 400;

FIG. 18 is a table showing a radius of curvature r, a conic constant K, and aspheric coefficients $A_i$ for optical components constituting optical pickup 400.

DETAILED DESCRIPTION OF THE PREFERRED EMBODIMENTS

Embodiments of an optical pickup pertaining to the present invention are described below with reference to the drawings.

1. Embodiment 1

1-1. Structure of Optical Pickup

Figure 1:
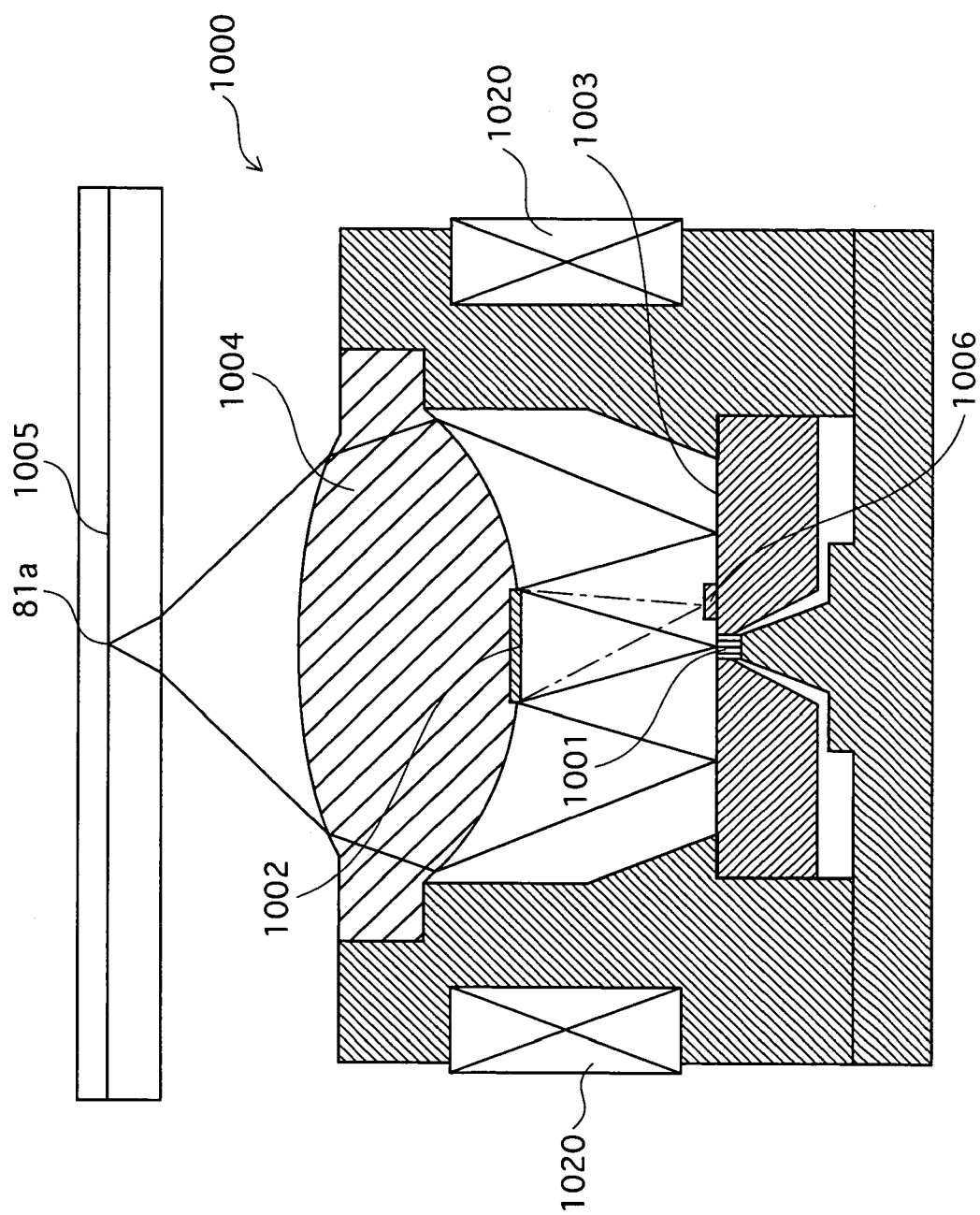
FIG. 1 is a cross-sectional view showing a structure of an optical pickup pertaining to the prior art.
Figure 2:
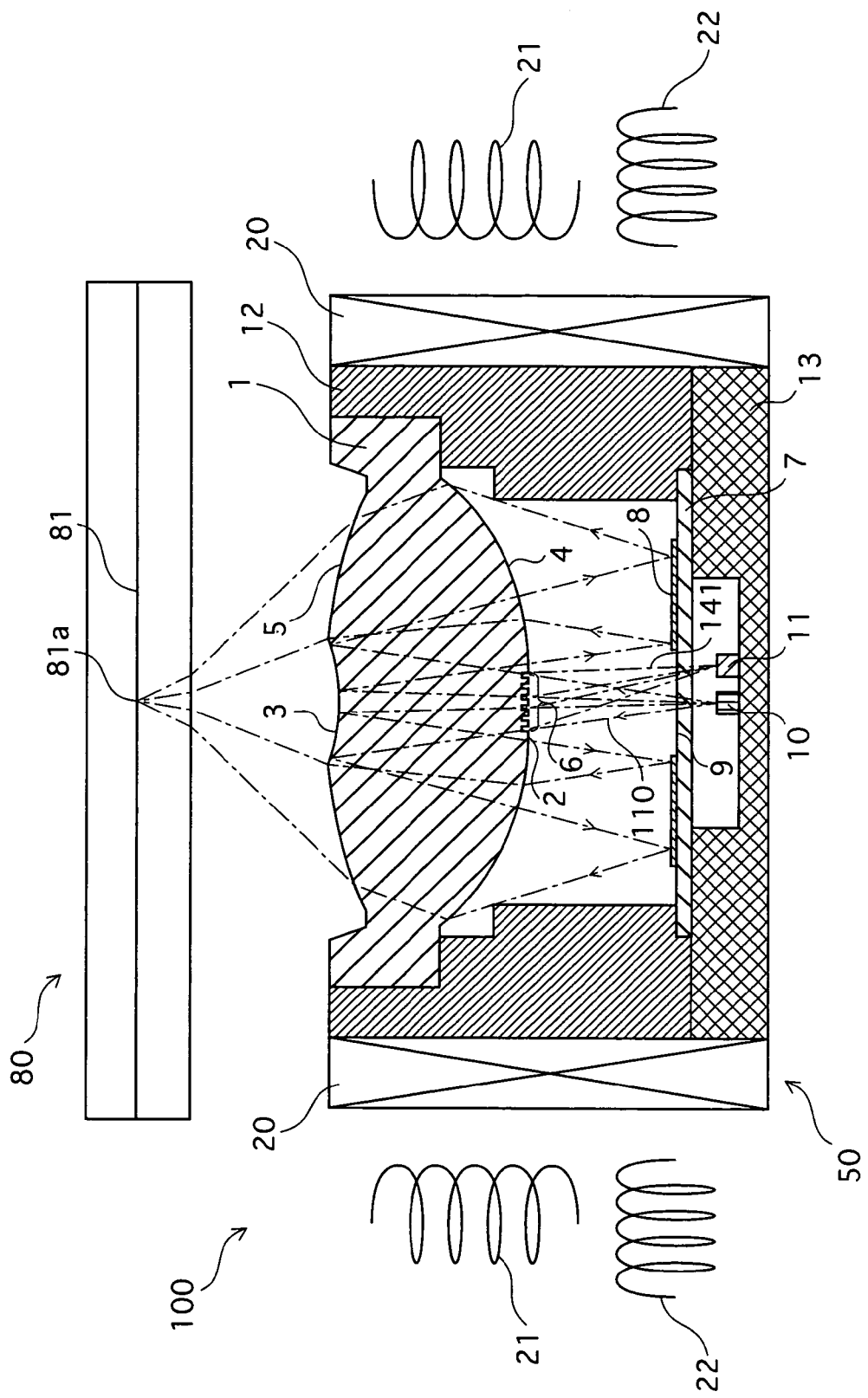
FIG. 2 is a cross-sectional view showing a structure of an optical pickup pertaining to an embodiment 1 of the present invention.

FIG. 2 is a cross-sectional view showing a structure of an optical pickup pertaining to embodiment 1 of the present invention. As shown in FIG. 2, optical pickup 100 is constituted from a movable part 50 and a fixed part (not depicted), and reads information recorded on a recording surface 81 of an optical disk 80. Movable part 50 includes housings 12 and 13, and a magnet 20. Housing 12 holds an objective lens unit 1 and a supporting board 7, while housing 13 holds a light-emitting element 10 and a light-receiving element 11. Light-emitting element 10 is, for example, a semiconductor laser diode, while light-receiving element 11 is, for example, a photodiode. Magnet 20 is adhered to housings 12 and 13. A focus coil 21 and a tracking coil 22 are secured to the fixed part.

Housing 12 is, for example, a plastic member, with objective lens unit 1 being disposed so as to plug one end of the cylindrical hole through housing 12.

Objective lens unit 1 includes a plane surface 2, a convex mirror 3, curved surfaces 4 and 5, and a transmissive diffraction grating 6, and is transparent except for convex mirror 3. Curved surface 4 is an annular curved surface facing supporting board 7, while curved surface 5 is an annular curved surface facing optical disk 80. Convex mirror 3, which is formed in an area enclosed by curved surface 5, reflects laser beams that enter the mirror after passing through the inner part of objective lens unit 1. Convex mirror 3 is an aspheric surface that bulges toward light-emitting element 10.

Objective lens unit 1, which is formed using a transparent resin, for example, is formed at the one time using a mold that corresponds to plane surface 2, convex mirror 3, curved surfaces 4 and 5, and transmissive diffraction grating 6.

Plane surface 2 is formed in an area enclosed by curved surface 4. Transmissive diffraction grating 6 diffracts laser beams that pass through the grating. At least one of curved surfaces 4 and 5 may have a lens effect (positive refractive power), and may be a Fresnel lens.

Housing 13 covers the end of housing 12 opposite the end at which objective lens unit 1 is disposed, and has a depression in a position corresponding to objective lens unit 1. Light-emitting element 10 and light-receiving element 11 are disposed in this depression.

Supporting board 7 is a flat board-shaped member disposed on a main surface of housing 13 so as to cover the depression in the housing. Laser beams from light-emitting element 10 enter supporting board 7 at a transmission area 9 that allows the laser beams to pass through. Transmission area 9 is big enough to allow a diffracted light beam 141 from transmissive diffraction grating 6 to enter light-receiving element 11, as beam 141 is required to do. An annular plane mirror 8 for reflecting laser beams is formed around transmission area 9.

A gap is provided between movable part 50 and the fixed part, with the orientation of movable part 50 being controlled by the electromagnetic force between focus coil 21, tracking coil 22 and magnet 20.

(1) Transmissive Diffraction Grating 6

Figure 3:
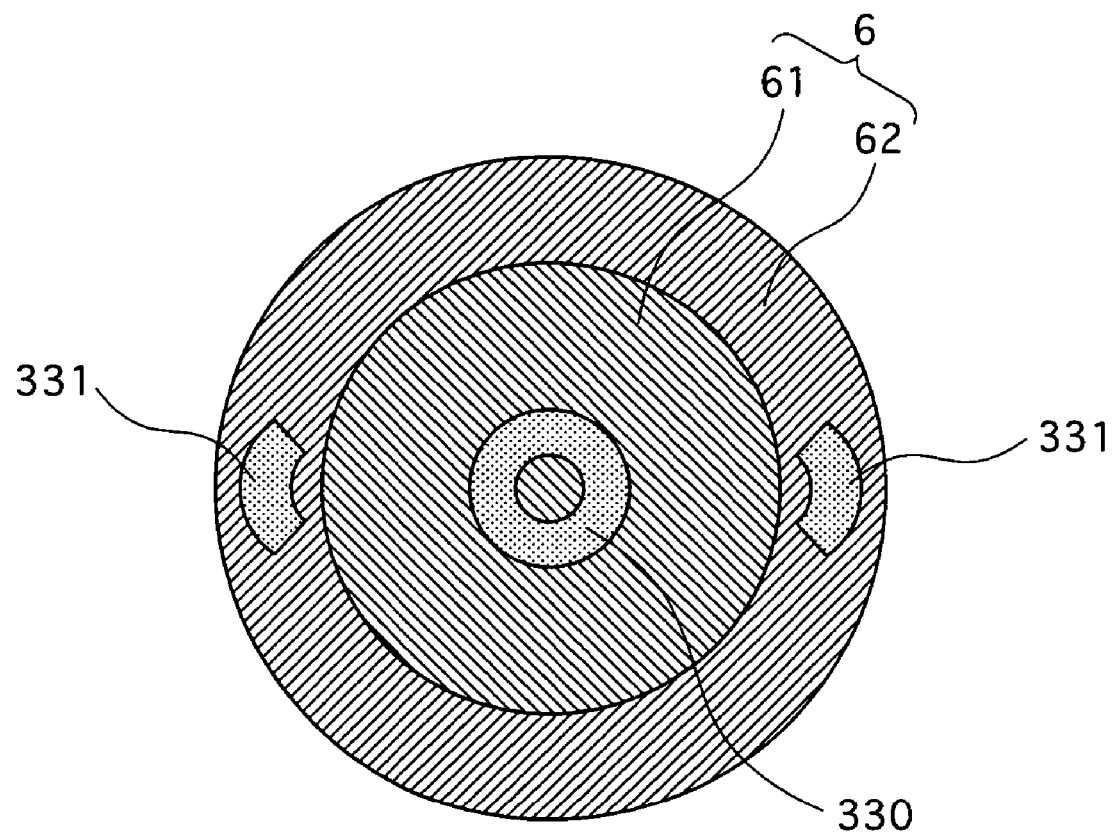
FIG. 3 is a plan view of a transmissive diffraction grating 6 from the light-emitting element side.

FIG. 3 is a plan view of transmissive diffraction grating 6 from the light-emitting element side. As shown in FIG. 3, transmissive diffraction grating 6 includes two diffraction grating areas 61 and 62. Diffraction grating areas 61 and 62 have different diffraction grating forms and depths. Note that in FIG. 3, area 330 is an area through which zero-order diffracted light, of the emission beam from light-emitting element 10, diffracted by transmissive diffraction grating 6 passes having being reflected by convex mirror 3, plane mirror 8, recording surface 81, plane mirror 8, and convex mirror 3. Area 331, on the other hand, is an area through which first-order diffracted light, of the emission beam from light-emitting element 10, diffracted by transmissive diffraction grating 6 passes after being reflected by recording surface 81, convex mirror 3, and the like.

(2) Specifications

Figure 4:
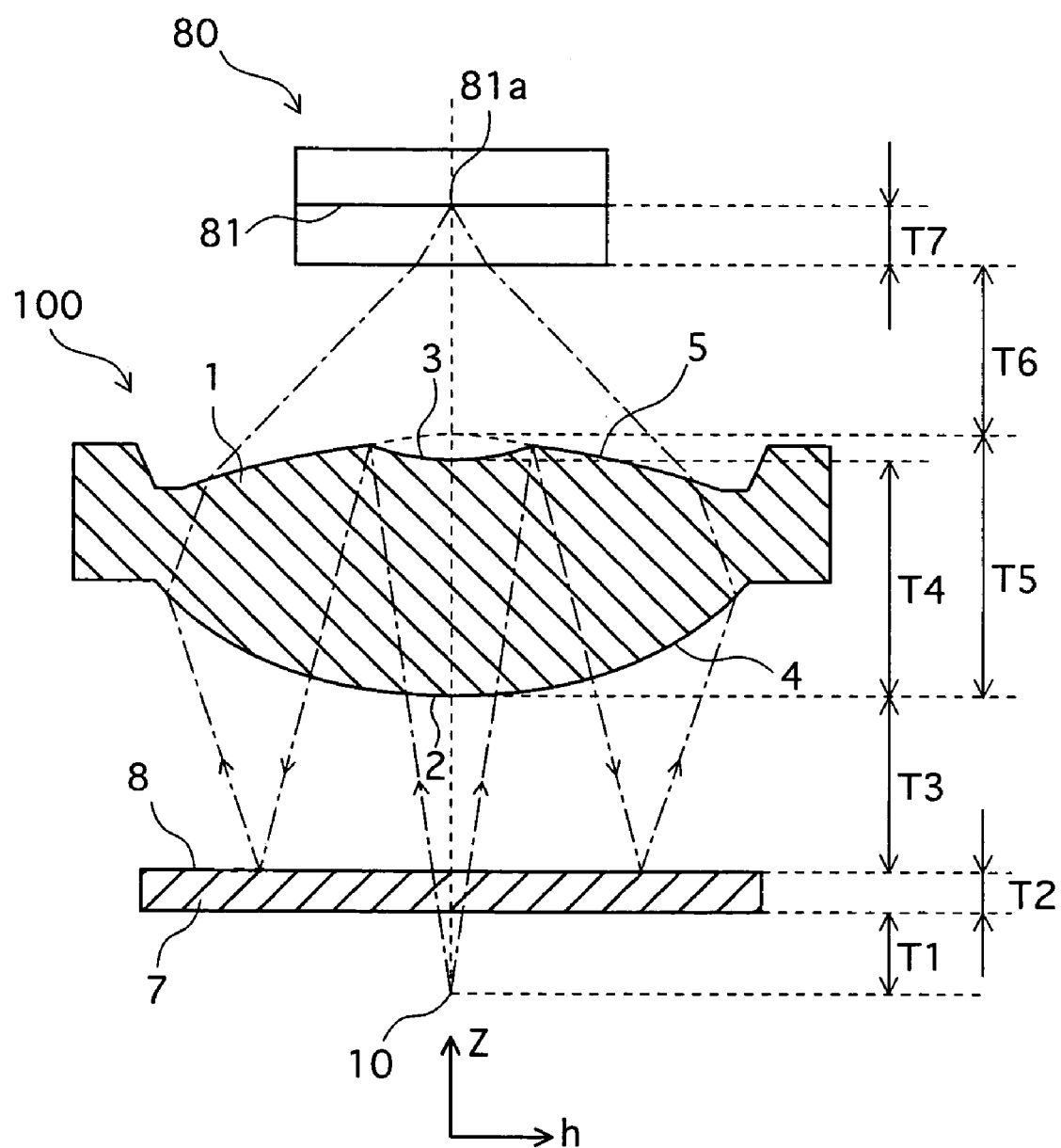
FIG. 4 is a cross-sectional view showing the structure of optical pickup 100.

The specifications of optical pickup 100 are shown next. FIG. 4 is a cross-sectional view showing the structure of optical pickup 100. As shown in FIG. 4, the distance from the light-emitting end face of light-emitting element 10 to supporting board 7 is T1, the thickness of supporting board 7 is T2, the distance from supporting board 7 to plane surface 2 of objective lens unit 1 is T3, the distance from plane surface 2 to convex mirror 3 is T4, the thickness of objective lens unit 1 when curved surface 5 is extended to the optical disk side of convex mirror 3 is T5, the distance from the extended curved surface of objective lens unit 1 to optical disk 80 is T6, and the distance from the main surface of optical disk 80 facing objective lens unit 1 to recording surface 81 is T7.

FIG. 5 is a table showing the measurements from T1 to T7. FIG. 6 is a table showing the refractive indexes of various members. Note that in the present embodiment, light-emitting element 10 emits beams having a 660 nm wavelength.

Convex mirror 3 and curved surfaces 4 and 5 are aspheric. FIG. 7 is an expression for deriving the aspheric forms of convex mirror 3 and curved surfaces 4 and 5. In FIG. 7, Z marks the position of the aspheric surfaces on the optical axis, as shown in FIG. 4. Furthermore, h shows the distance from the optical axis of the aspheric surfaces, while r shows the radius of curvature. K is a conic constant, and $A_{2i}$ is an aspheric coefficient. FIG. 8 is a table showing the radius of curvature r, conic constant K, and aspheric coefficients $A_{2i}$ for optical components constituting optical pickup 100.

Note that the above numerical values are merely by way of example, and other measurements may be employed. For example, supporting board 7 may be a flat member having an aperture provided in a central part where annular plane mirror 8 is not formed.

1-2. Optical Properties of Optical Pickup 100

The optical properties of optical pickup 100 are described next.

(1) Basic Properties

With optical pickup 100, as shown in FIG. 2, an emission beam 110 emitted from light-emitting element 10 passes through transmission area 9 and transmissive diffraction grating 6 and is reflected by convex mirror 3, refracted by curved surface 4, reflected by plane mirror 8, and refracted by curved surfaces 4 and 5, before being focused at position 81a on recording surface 81 of optical disk 80. Here, emission beam 110 reflected by convex mirror 3 may be refracted by plane surface 2 instead of curved surface 4, before being reflected by plane mirror 8.

The emission beam becomes a reflected beam upon being reflected at position 81a. The intensity distribution of the reflected beam depends on the state of recording surface 81 at position 81a (i.e. whether or not a pit exists).

The reflected beam is refracted by curved surfaces 5 and 4, reflected by plane mirror 8, refracted by curved surface 4 and reflected by convex mirror 3, before entering transmissive diffraction grating 6. First-order diffracted light of the reflected beam diffracted by transmissive diffraction grating 6 enters light-receiving element 11 after passing though transmission area 9. Diffracted light beam 141 is converted into a plurality of electric signals in light-receiving element 11, and position information signals (focus error signal and tracking error signal) and recording information signals are generated based on the electric signals.

Power is applied to focus coil 21 and tracking coil 22 depending on the obtained focus error and tracking error signals. Movable part 50 is thus controlled using the electromagnetic force between the coils and magnet 20, so as to focus the emission beam at focusing position 81a of recording surface 81 in optical disk 80.

(2) Effects of Convex Mirror 3

The effects of convex mirror 3 are described next. For the sake of convenience, the description given here does not cover the effects of transmissive diffraction grating 6.

Figure 9A:
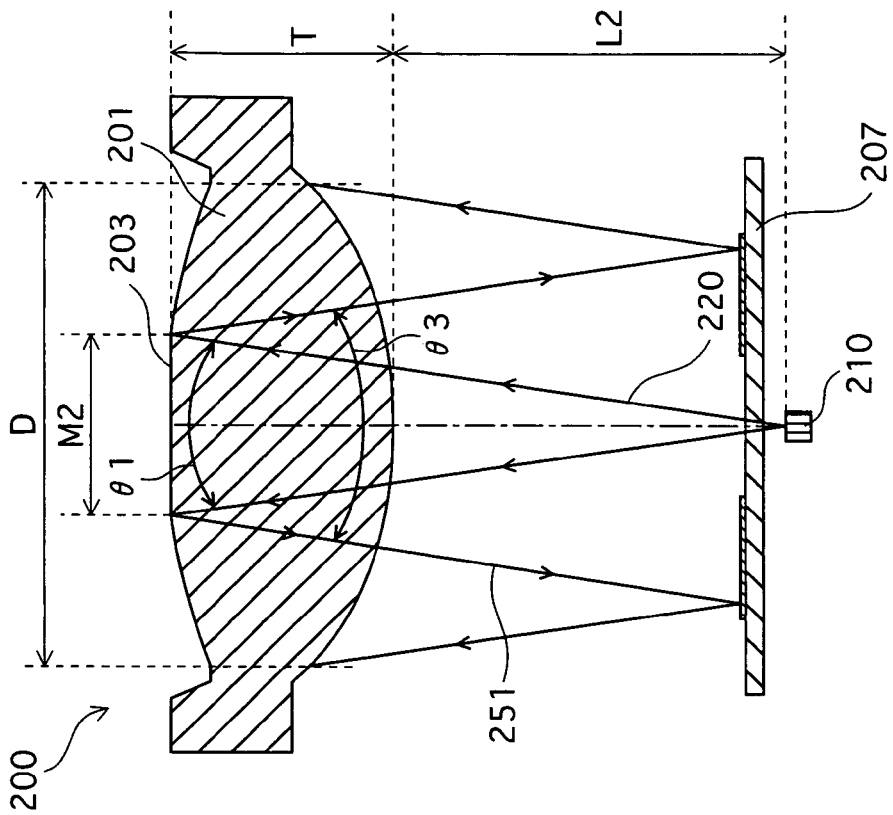
FIGS. 9A & 9B show the optical path of a beam emitted from a light-emitting element 10.
Figure 9B:
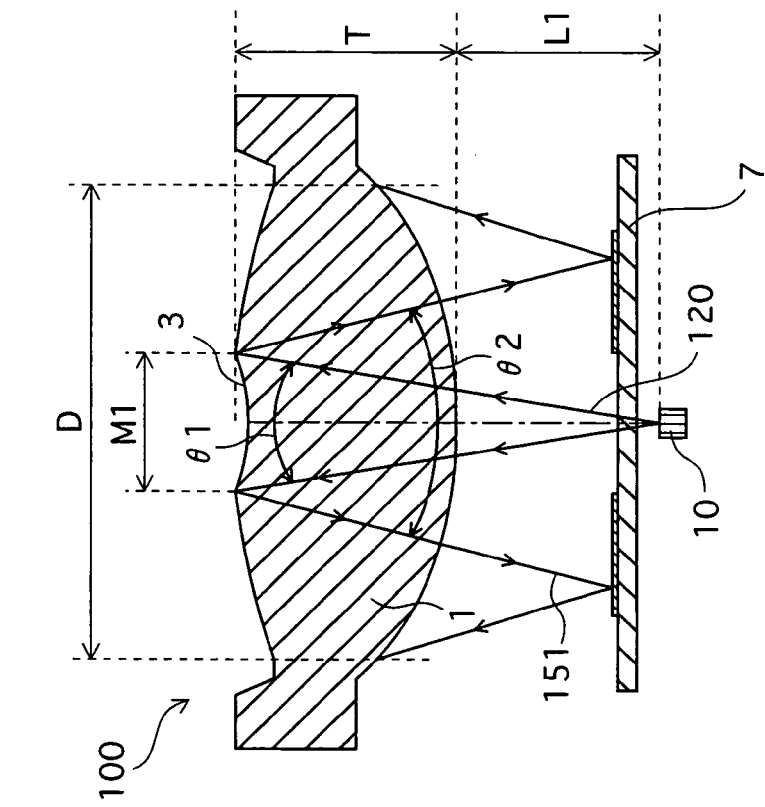

FIGS. 9A and 9B are cross-sectional views showing the optical path of a beam emitted from light-emitting element 10, FIG. 9A showing the optical path pertaining to the present embodiment and FIG. 9B showing the optical path when a plane reflecting surface 203 is used instead of convex mirror 3. Note that in FIG. 9B, an optical pickup 200 includes an objective lens unit 201 having plane reflecting surface 203, a supporting board 207 that supports a plane mirror, and a light-emitting element 210. Light-emitting element 210 emits beams at the same divergence angle as light-emitting element 10.

In the present embodiment, as shown in FIG. 9A, beam 110 emitted from light-emitting element 10 at a divergence angle of θ1 becomes a beam having a cone angle of θ2 upon being reflected by convex mirror 3. Here, the cone angle θ2 is larger than the divergence angle θ1 due to the qualities of convex mirror 3. In FIG. 9B, on the other hand, a beam emitted at the same divergence angle θ1 becomes a beam having a cone angle of θ3 when reflected by plane reflecting surface 203. Here, the divergence angle θ1 and the cone angle θ3 are roughly equal. Note that for the sake of convenience, the refraction effect of the beam when entering the objective lens unit and when emitted from the objective lens unit is not covered here.

It is possible to irradiate the beam over the entire entrance pupil of objective lens unit 1 while shortening a distance T+L1 between convex mirror 3 and light-emitting element 10 in comparison to a distance T+L2 between plane reflecting surface 203 and light-emitting element 210, where D and T are respectively the diameter and thickness of the entrance pupil of both objective lens units 1 and 201. Consequently, the size of optical pickup 100 can be reduced while maintaining magnifying power, when objective lens units 1 and 201 are designed to have an equal numbers of apertures on the optical disk side.

Also, having distance L1 shorter than distance L2 makes it possible to reduce a diameter M1 of convex mirror 3 in comparison to a diameter M2 of plane reflecting surface 203. This enables the percentage of a reflected beam 151 from supporting board 7 blocked by convex mirror 3 to be reduced in comparison to the percentage of a reflected beam 251 from supporting board 207 blocked by plane reflecting surface 203. Light-use efficiency can thus be improved.

Figure 10:
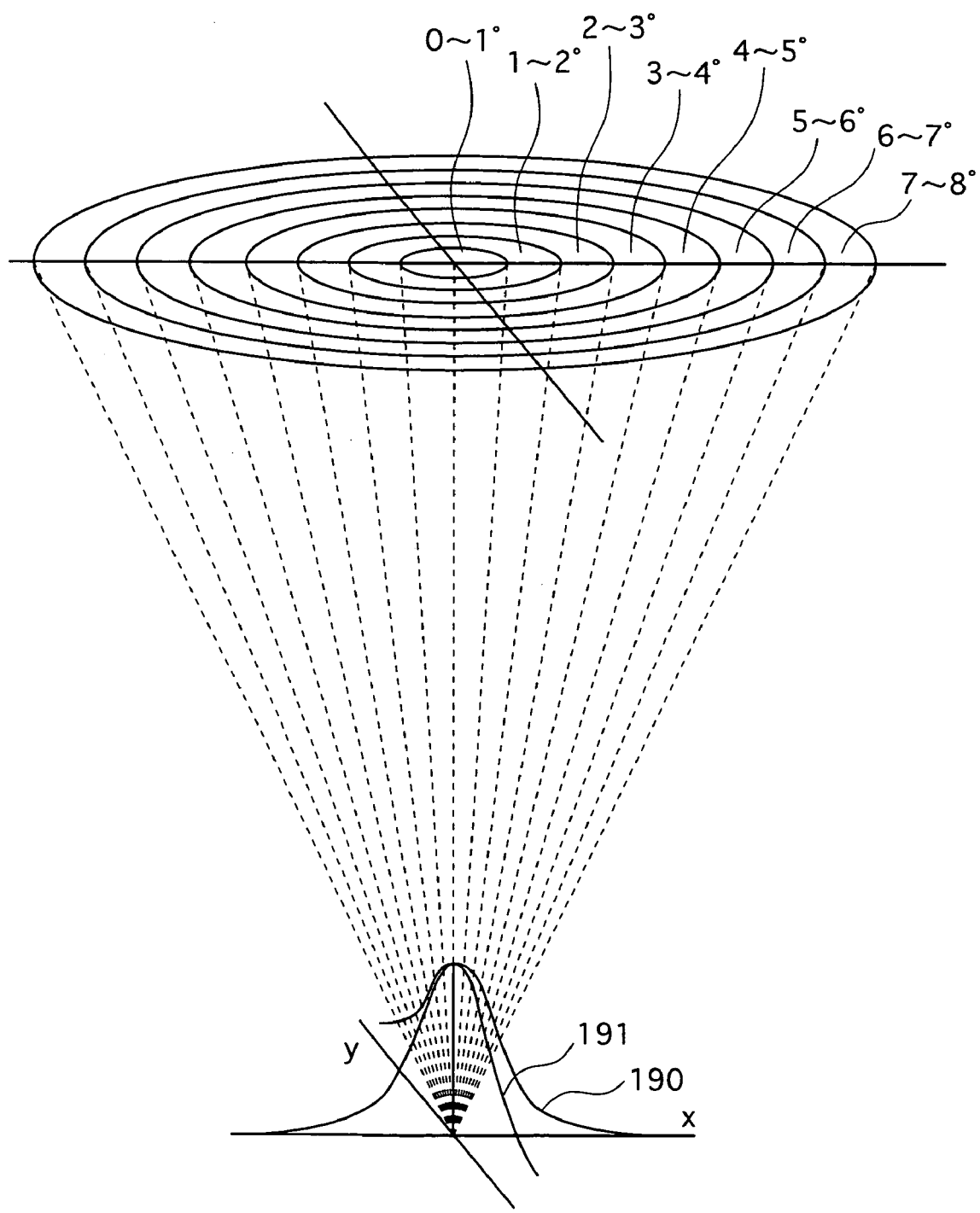
FIG. 10 shows the intensity distribution of an emission beam from light-emitting element 10.

FIG. 10 shows the intensity distribution of a beam emitted from light-emitting element 10. A graph 190 expresses the intensity distribution in an x direction, while a graph 191 expresses the intensity distribution in a y direction. In the present embodiment, the laser beam used has a divergence angle (half angle) of 6 degrees or less, which is similar to the majority of other optical pickups.

For example, if the intensity distribution of the laser beam follows a Gaussian distribution and the full widths at half maximum (FWHM) in the x and y directions are 10 degrees and 28 degrees respectively, a laser beam having a divergence angle of 6 degrees or less occupies approximately 28% of the total laser beam.

Figure 11:
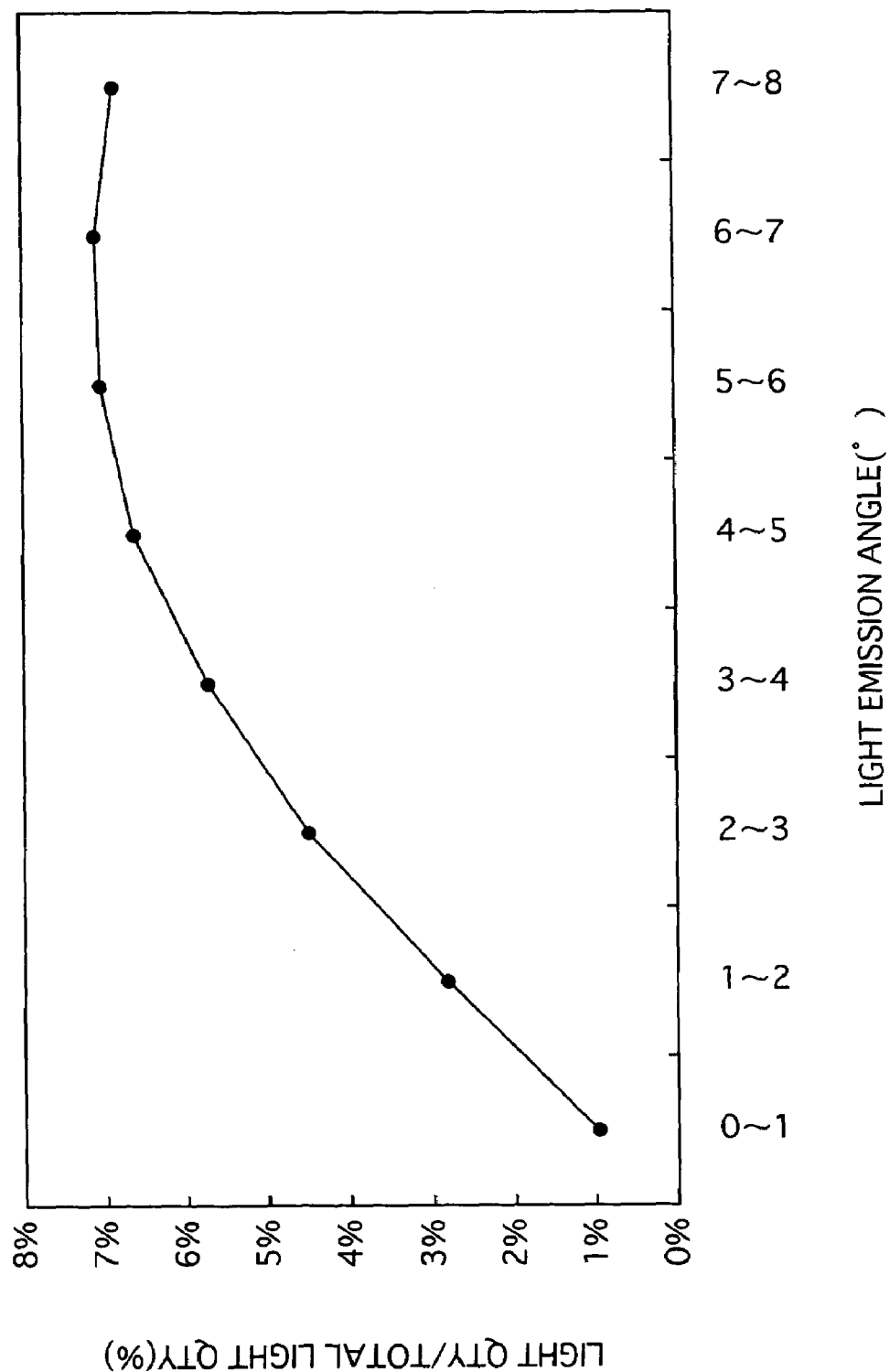
FIG. 11 is a graph showing the light quantity distribution for each light emission angle of the emission beam from light-emitting element 10.

FIG. 11 is a graph expressing the light quantity distribution for each light emission angle in the above case. In other words, FIG. 11 is a graph expressing the light quantity for each annular area partitioned at 1-degree light emission angles as shown in FIG. 10. FIG. 12 is a graph expressing the light quantity at 1-degree light emission angles starting from 0 degrees.

As shown in FIG. 11, the light quantity is greatest in an annular area from a light emission angle of 6 degrees inclusive to less than 7 degrees. Also, the light quantity in annular areas from a light emission angle of less than 1 degree and from 1 degree inclusive to less than 2 degrees is respectively around 1% and 2.8% of the total light quantity, with the ratio being sufficiently small in comparison to the light quantity in areas from 2 degrees and above. Consequently, if the convex mirror blocks laser beams up to but not including a light emission angle of 2 degrees, for example, the light-use efficiency will be approximately 24%.

On the other hand, the use of a plane mirror instead of convex mirror 3 results in an even greater amount of the laser beam being blocked. Consequently, light-use efficiency can be effectively improved by using convex mirror 3.

(3) Effects of Transmissive Diffraction Grating 6

The effects of transmissive diffraction grating 6 are described next.

FIGS. 13A and 13B show the optical path of first-order diffracted light diffracted by transmissive diffraction grating 6, FIG. 13A showing the optical path from emission by light-emitting element 10 until entry to recording surface 81 and FIG. 13B showing the optical path from reflection by recording surface 81 until entry to light-receiving element 11.

As shown in FIG. 13A, an emission beam 310 from light-emitting element 10 is diffracted by transmissive diffraction grating 6. A first-order diffracted beam 321 of beam 310 is focused at a position 81b on recording surface 81 after being reflected by convex mirror 3, refracted by curved surface 4, reflected by plane mirror 8, and refracted by curved surfaces 4 and 5. Note that position 81b differs from position 81a.

As shown in FIG. 13B, first-order diffracted beam 321 becomes a reflected beam 331 upon being reflected at position 81b. Reflected beam 331 enters transmissive diffraction grating 6 after being refracted by curved surfaces 5 and 4, reflected by plane mirror 8, refracted by curved surface 4, and reflected by convex mirror 3. The entrance position at transmissive diffraction grating 6 depends on the position, form and size of convex mirror 3. In the present embodiment, reflected beam 331 enters at diffraction grating area 62.

Zero-order diffracted light, of the emission beam from light-emitting element 10, diffracted by transmissive diffraction grating 6 enters diffraction grating area 61 after having traveled via convex mirror 3 and the like. First-order diffracted light of the reflected beam that entered diffraction grating area 61 enters light-receiving element 11.

Note that since reflected beam 331 occurs at position 81b, which differs from position 81a, the intensity distribution of reflected beam 331 does not give an indication of the state of recording surface 81 at position 81a (i.e. whether or not a pit exits). Reading precision drops when reflected beam 331 enters light-receiving element 11. For this reason, with diffraction grating area 62, the diffraction grating form is determined so that a diffracted beam 333 of reflected beam 331 does not enter light-receiving element 11, while the diffraction grating depth is determined so that reflected beam 332 is diffracted by diffraction grating area 62 without fail.

This allows the reading precision of optical pickup 100 to be improved.

2. Embodiment 2

The configuration of an embodiment 2 is described next. An optical pickup pertaining to the present embodiment, while having roughly the same structure as optical pickup 100 pertaining to embodiment 1, differs in the form of the convex mirror included in the objective lens unit. The following description focuses mainly on this difference.

2-1. Structure of Optical Pickup

FIG. 14 is a cross-sectional view showing the structure of an optical pickup pertaining to the present embodiment. As shown in FIG. 14, optical pickup 400 is, the same as optical pickup 100, constituted from a fixed part (not depicted) that includes a focus coil 421 and a tracking coil 422, and a movable part that includes housings 412/413 and a magnet 420.

An objective lens unit 401 is secured in plastic housing 412. Objective lens unit 401 includes a plane surface 402, a convex mirror 403, curved surfaces 404 and 405, and a transmissive diffraction grating 406. In the depression in housing 413 are housed a light-emitting element 410 and a light-receiving element 411, with a supporting board 407, which supports an annular plane mirror 408, covering the depression. The center of a main surface of the supporting board is a transmission area 409 that allows beams emitted from the light-emitting element to pass through.

Note that supporting board 407 may be a plane board having an aperture in a central part not needed to support plane mirror 408.

(1) Specifications

Figure 15:
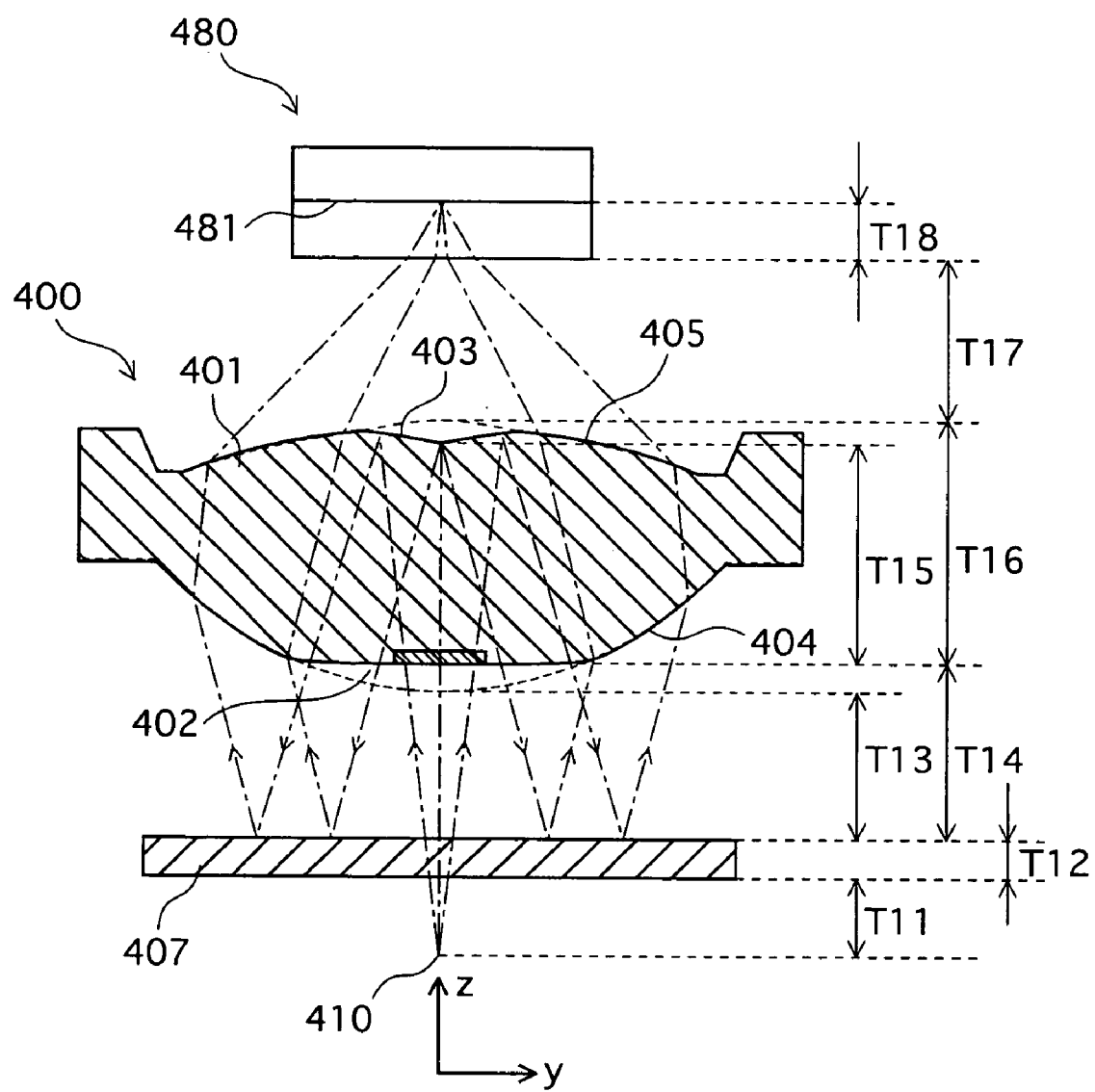
FIG. 15 is a cross-sectional view showing the structure of optical pickup 400.

The specifications of optical pickup 400 are shown next. FIG. 15 is a cross-sectional view showing the structure of optical pickup 400. As shown in FIG. 15, the distance from the light-emitting end face of light-emitting element 410 to supporting board 407 is T11, the thickness of supporting board 407 is T12, the distance from supporting board 407 to plane surface 402 of objective lens unit 401 when curved surface 404 is extended to the light-emitting element side of plane surface 402 is T13, the distance from supporting board 407 to plane surface 402 is T15, the thickness of objective lens unit 401 when curved surface 405 is extended to the optical disk side of convex mirror 403 and curved surface 404 is extended to the light-emitting element side of plane surface 402 is T16, the distance from the extended curved surface of objective lens unit 401 to optical disk 480 is T17, and the distance from the main surface of optical disk 480 facing objective lens unit 401 to recording surface 481 is T18.

FIG. 16 is a table showing the measurements from T11 to T18. The refractive indexes of the various members are the same as optical pickup 100, with light-emitting element 410 emitting beams having a 660 nm wavelength.

Convex lens 403 included in objective lens unit 401 has a conical surface that extends toward light-emitting element 410. The form of convex lens 403 and curved surfaces 404 and 405 can be derived using the FIG. 17 expression. FIG. 18 is a table showing a radius of curvature r, a conic constant K, and aspheric coefficients $A_i$ for optical components constituting optical pickup 400.

Note that the above numerical values are merely by way of example, and other measurements may be employed.

2-2. Optical Properties of Optical Pickup 400

The optical properties of optical pickup 400 are described next.

With optical pickup 400, as shown in FIG. 14, an emission beam 510 emitted from light-emitting element 410 is focused on recording surface 481 of optical disk 480 after having traveled via transmission area 409, transmissive diffraction grating 406, convex mirror 403, plane surface 402, plane mirror 408, and curved surfaces 404 and 405, in the stated order. A reflected beam 511 resulting from emission beam 510 being reflected by recording surface 481 enters light-receiving element 411 having traveled via curved surfaces 404 and 405, plane mirror 408, plane surface 402, convex mirror 403, transmissive diffraction grating 406, and transmission area 409, in the stated order.

Here, the light reflected by convex mirror 403 may be refracted by curved surface 404, before being reflected by plane mirror 408.

Note that because convex mirror 403 in the present embodiment has a conical surface, emission beam 510 reflected by convex mirror 403 enters the annular area of plane mirror 408, while the optical intensity of emission beam 510 is zero in the part surrounded by this annular area. In other words, it is possible to prevent those parts of the emission beam from light-emitting element 410 in a vicinity of the chief ray where the optical intensity is greatest from entering transmission area 409 and being lost or being blocked by reflecting surface 403. Consequently, the light-use efficiency of emission beam 510 can furthermore be improved in addition to the advantages of embodiment 1.

3. Variations

The present invention, while having been described above based on the preferred embodiments, is of course not limited to these embodiments. The following variations can be implemented.

(1) While in embodiment 1, the reading precision of recorded data is improved by structuring transmissive diffraction grating 6 as shown in FIG. 3, the present invention is, needless to say, not limited to this configuration. The following structure may be adopted.

Figure 19A:
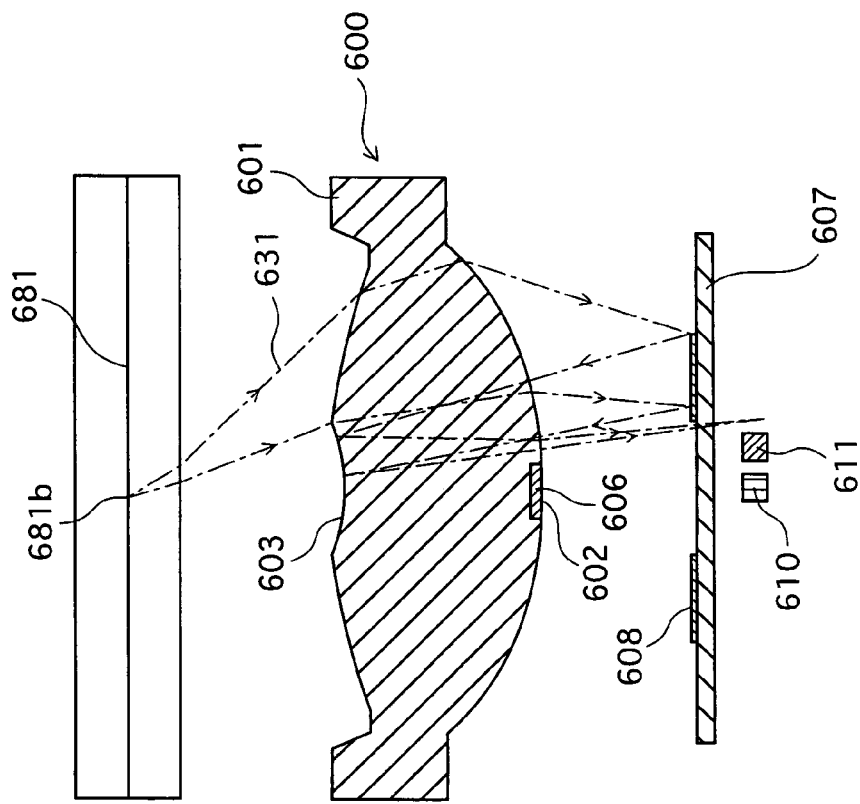
FIGS. 19A and 19B are cross-sectional views showing the optical path in an optical pickup pertaining to a variation 1 of the present invention.
Figure 19B:
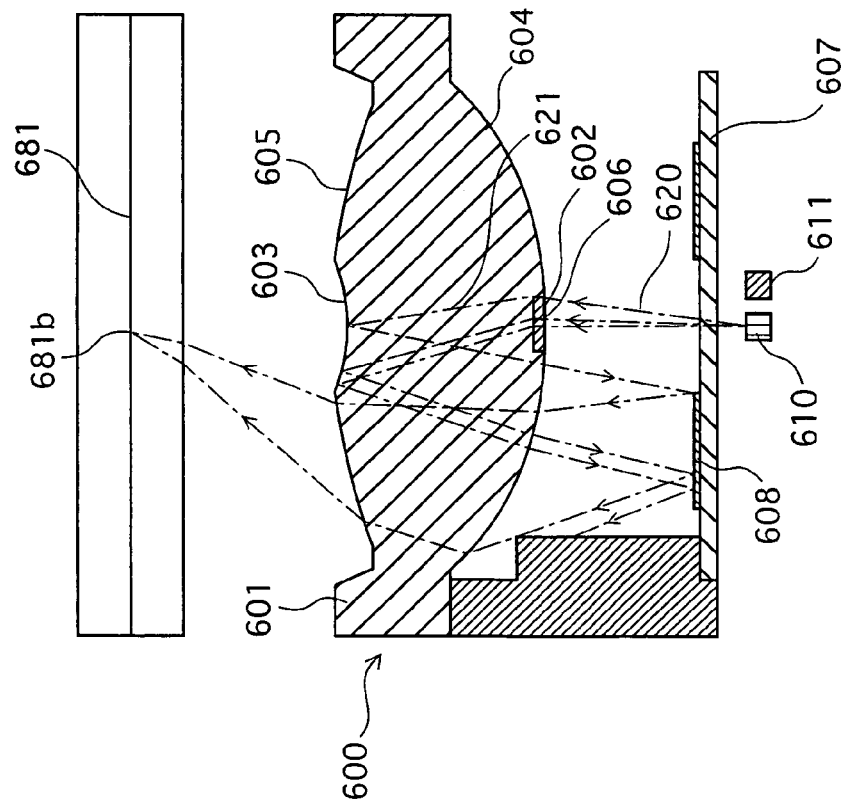

FIGS. 19A and 19B are cross-sectional views showing the optical path in an optical pickup pertaining to the present variation, FIG. 19A showing the outbound path from the light-emitting element to the optical disk and FIG. 19B showing the return path from the optical disk to the light-receiving element.

As shown in FIGS. 19A and 19B, an optical pickup 600 includes an objective lens unit 601, a supporting board 607, a plane mirror 608, a light-emitting element 610 and a light-receiving element 611, and reads information recorded on a recording surface 681 of the optical disk. Objective lens unit 601 includes a plane surface 602, a convex mirror 603, curved surfaces 604 and 605, and a transmissive diffraction grating 606.

As shown in FIG. 19A, a diffracted beam 621 (excluding the zero-order diffracted beam), of an emission beam 620 from light-emitting element 610, diffracted by the transmissive diffraction grating is focused at a position 681*b* on recording surface 681 having traveled via convex mirror 603, curved surface 604, plane mirror 608, and curved surfaces 604 and 605. On the other hand, the zero-order diffracted beam of emission beam 620 is focused at a different position from position 681*b*. Consequently, the intensity distribution of the reflected beam at position 681*b* does not give an indication of the recorded information at the focusing position of the zero-order diffracted beam.

As shown in FIG. 19B, a reflected beam 631 at position 681*b* is refracted by curved surface 604 after having passed via curved surfaces 605 and 604, plane mirror 608, curved surface 604, and convex mirror 603. This results in reflected beam 631 ultimately entering at a place other than light-receiving element 611.

In other words, with optical pickup 600, the position, form and size of convex mirror 603, curved surfaces 604 and 605, and transmissive diffraction grating 606 are designed so that the diffracted beam (excluding the zero-order diffracted beam) of emission beam 620 diffracted by transmissive diffraction grating 606 does not enter light-receiving element 611. Also, reflected beam 631 does not pass through transmissive diffraction grating 606. Consequently, it is possible, even with the present variation, to prevent a drop in the reading precision of recorded data caused by light-receiving element 611 receiving reflected beam 631.

(2) While convex lens 3 is aspheric in embodiment 1, the present invention is, needless to say, not limited to this configuration. A convex lens taking a spherical form may be used. The effects of the present invention can be obtained as long as a convex lens is used, irrespective of whether or not the lens is spherical.

(3) While not particularly touched on in the preferred embodiments, the optical disk to and from which an optical pickup pertaining to the present invention writes and reads information may, apart from being a CD or a DVD, be a PD (phase change rewritable disk) or an MO (magneto-optical disk).

(4) While embodiment 1 is described in terms of using plane mirror 8, the present invention is, needless to say, not limited to this configuration. For example, a convex mirror may be used instead of a plane mirror. The effects of the present invention can be obtained even with this configuration.

While the present invention has been fully described by way of examples with reference to the accompanying drawings, it is to be noted that various changes and modifications will be apparent to those skilled in the art. Therefore, unless such changes and modifications depart from the scope of the present inventions they should be construed as being included therein.

What is claimed is:

1. An optical pickup for emitting a beam onto an optical recording medium and using a reflected beam from the recording medium to read recorded information, comprising:
    a light-emitting element operable to emit the beam;
    an objective lens unit in which a central part of a surface, facing the light-emitting element, of an objective lens disposed so that an optical axis is substantially aligned with a chief ray of the beam emitted by the light-emitting element, is a transmissive diffraction grating, and a central part of a surface of the objective lens that will face the optical recording medium is a convex mirror which bulges toward the light-emitting element;
    an annular reflecting mirror that encompasses the optical axis of the objective lens and is operable to reflect toward the objective lens, the beam from the light-emitting element that has passed through the transmissive diffraction grating and been reflected by the convex mirror; and
    a light-receiving element operable to receive first-order diffracted light, of the reflected beam from the recording medium, diffracted by the transmissive diffraction grating.

2. The optical pickup of claim 1, wherein the light-emitting and light-receiving elements are disposed on opposite sides of the objective lens, with the reflecting mirror positioned therebetween.

3. The optical pickup of claim 1, wherein the convex mirror is aspheric.

4. The optical pickup of claim 1, wherein the convex mirror is conical.

5. The optical pickup of claim 1, wherein a depth of the transmissive diffraction grating differs between a central part in plan view from the light-emitting element and a circumferential part encompassing the central part.

6. The optical pickup of claim 1, wherein, in the objective lens unit, at least one of a surface surrounding the transmissive diffraction grating and a surface surrounding the convex mirror has refractive power.

7. The optical pickup of claim 1, wherein the objective lens is a Fresnel lens.

8. The optical pickup of claim 1, wherein the reflecting mirror is a plane mirror.

* * * * *